United States Patent [19]

Whitaker, Sr.

[11] 4,455,004

[45] Jun. 19, 1984

[54] FLIGHT CONTROL DEVICE FOR AIRPLANES

[75] Inventor: Robert H. Whitaker, Sr., Atlanta, Ga.

[73] Assignee: Lockheed Corporation, Burbank, Calif.

[21] Appl. No.: 415,016

[22] Filed: Sep. 7, 1982

[51] Int. Cl.³ ............................ B64C 5/08; B64C 9/12
[52] U.S. Cl. ................................ 244/90 R; 244/45 R; 244/76 R; 244/82
[58] Field of Search .................. 244/45 R, 76 R, 76 C, 244/90 R, 90 A, 225, 198, 75 A, 199, 82

[56] References Cited

U.S. PATENT DOCUMENTS

| | | | |
|---|---|---|---|
| 1,464,784 | 8/1923 | Tarbox | 244/82 |
| 1,763,228 | 6/1930 | Fokker | 244/90 R |
| 1,798,914 | 3/1931 | Thurston | 244/82 |
| 2,049,188 | 7/1936 | Alfaro | 244/82 |
| 2,369,820 | 2/1945 | Douglas | 244/90 R |
| 2,406,588 | 8/1946 | Cornelius | 244/45 R |
| 2,734,704 | 2/1956 | Vogt | 244/82 |
| 2,846,165 | 8/1958 | Axelson | 244/90 R |
| 3,279,725 | 10/1966 | Andrew et al. | 244/76 C |

FOREIGN PATENT DOCUMENTS 330774 12/1920 Fed. Rep. of Germany .... 244/90 R
1207944 2/1960 France ............................ 244/90 R Primary Examiner—Trygve M. Blix
Assistant Examiner—Rodney Corl
Attorney, Agent, or Firm—John J. Sullivan

[57] ABSTRACT

Aircraft wing fatigue life and weight are strongly influenced by maximum wing root bending moment. The object of the invention is to augment the wing root bending moment relief that can be provided by the deflection of aircraft ailerons (12) in the conventional manner, while reducing or eliminating aileron induced wing torsional loading. To accomplish this, a movable aerodynamic control surface (14) is mounted on the outboard side of a contoured boom (13) situated at each wingtip. The exact size and location of the control surfaces (14) are determined by the particular aircraft application. Control surface size is a function of the aircraft aileron size, and each control surface (14) is located ahead of the elastic axis (10') of the wing (10). In addition to providing load alleviation, asymmetric deflection of the wingtip control surfaces (14) creates an aircraft rolling moment that adds to that produced by aileron deflection.

10 Claims, 4 Drawing Figures

FLIGHT CONTROL DEVICE FOR AIRPLANES

Technical Field

This invention relates to flight control devices for airplanes being in particular a device used to redistribute the loads acting on the wings of the airplane under conditions when maximum loads are imposed thereon. By altering these loads during these times and conditions the wings can be made lighter for the same level of strength. Conversely, the wings can be made to have a longer service life for the same wing weight or by proper design, a combination of the two improvements can be achieved. Reduction of airplane weight has many benefits, among them being reduced fuel consumption during flight. Increased service life is an improvement unto itself.

Background of the Invention

Loads acting on an airplane wing are normally distributed across the span of the wing in such a manner as to provide adequate life and to minimize the so-called induced drag which is a function of the load distribution. During maneuvering flight, when encountering a wind gust, or when flying at very high speeds the magnitude of wing loads can be altered considerably from that occurring during normal cruise flight. In particular, the wing bending moment can be greatly increased. The required strength of the wing, its weight and its service life, are all highly dependent on the maximum value of overall loads and wind bending moment experienced by the wing structure. A primary purpose of this invention is to reduce wing loads under the aforementioned conditions.

In addition, a large wing such as employed on transport aircraft is by necessity flexible, that is, it can bend or twist. When it is necessary to roll the airplane about its longitudinal axis, controls i.e. ailerons located on the outboard portion of the wing are deflected to produce an asymmetric lift distribution which results in an airplane rolling moment. Due to wing flexibility, the effectiveness of aileron controls can be significantly reduced during moderate to high speed flight. To maintain adequate roll performance additional controls i.e. spoilers are often required. These controls add complexity and weight to the airplane. A purpose of this invention is to reduce the loss in aileron effectiveness caused by flexibility and to add to the available airplane rolling moment.

The Prior Art

Earlier attempts to alter wing load distribution have usually centered on the aircraft ailerons. Typically, an automatic flight control system is employed to deflect the ailerons upward under conditions when high wing loads are experienced. This upward aileron deflection results in a wing center of pressure shift toward the fuselage and a reduction in wing root bending moment. The disadvantage of employing such a system is that wing torsion is increased. Wind torsion is defined as a twisting of the wing about its lateral axis i.e. a spanwise reference line established by the particular wing geometry. If ailerons are to be employed for bending moment relief on air airplane the wing must be made torsionally stiffer and hence heavier than would otherwise be the case. While application of a load alleviation system may be desirable for certain airplanes currently in operation to extend their service life, use of the ailerons for this purpose is often not possible because of wing torsion constraints.

Summary of the Invention

The present invention proposes to improve on the prior art and to that end proposes an additional control surface to be placed beyond the normal wing tip to augment bending moment relief provided by the ailerons and to counteract the torsion produced by deflection of the ailerons. Such a device also reduces the loss in aileron effectiveness due to wing flexibility and improves the roll performance of the airplane, thereby reducing the need for auxiliary roll control devices or spoilers.

It is envisioned that the present invention hereinafter sometimes referred to as a wingtip control device will be used in conjunction with conventional aircraft ailerons as part of an automatic flight control system to alleviate wing loads under conditions described earlier. The actual wingtip control device consists of a movable aerodynamic surface attached, by any suitable means, to and extending outwardly from the airplane wingtip. This control surface is normally disposed with its chord line substantially in the plane of the wing chord with its leading edge substantially parallel to the leading edge of the wing. The control surface is rotatable within a range of approximately 10° to 30° up and down relative to the normal or undeflected position, moving concurrently with and in the same direction as the associated aileron although not necessarily the same amount when operating in conjunction with the aileron.

Preferably, the movable control surface is positioned ahead of the location of the elastic axis at the wingtip area. The elastic axis is defined as the line along the span of the wing where no deformation occurs when a loading is applied to the wing.

In its preferred embodiment the movable control surface is connected to the wingtip by means of and through a boom configured to provide an end plating effect thereby improving the effectiveness of this control surface. The maximum lateral dimension of the attaching boom is as small as possible consistent with the requirements of structural integrity and of providing space for an actuator mechanism capable of moving the control surface.

It is well known that the movement of an aerodynamic surface exerts an influence upon another surface located in the nearby region. It is because of this that the movable control surface herein proposed exerts an influence on the loading of the wing. By moving the aft end of the control surface up in conjunction with aileron motion in the same direction, loads on the outer panel of the wing are reduced, the lessening the bending moment occurring along the wing span. By acting ahead of the wing elastic axis the force on the movable control surface counteracts the twisting of the wing caused by the aileron deflection. In the rolling mode the force on the wingtip control surface, along with the reduction of wing twist caused by its application, acts to improve the rolling moment produced by the aileron acting alone.

The precise size and location of the movable control surfaces varies with the specific airplane application and the benefit desired. Typically, the control surfaces will range in size from one-fourth to three-fourths of the size (area) of the airplane ailerons. The location of the leading edge of each control surface is generally from slightly aft of the leading edge of the associated wing leading edge to about one wingtip chord length ahead of the associated wing leading edge. Each control surface has an aerodynamic i.e. an airfoil shape cross-section.

With the above and other objects in view as will be apparent, this invention consists in the construction, combination and arrangement of parts all as hereinafter more fully described, claimed and illustrated in the accompanying drawings.

Figure 1:
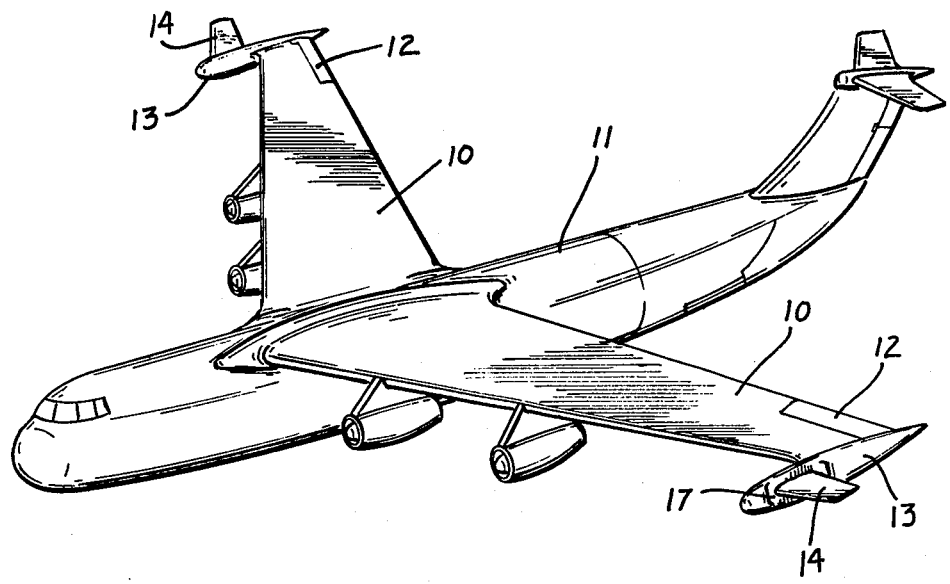
FIG. 1 is a perspective view of a typical transport airplane with swept wings and a wingtip control device as herein proposed installed on each wingtip to show the relative location of the attaching boom and movable control surface thereof along with the conventional aircraft ailerons.
Figure 2:
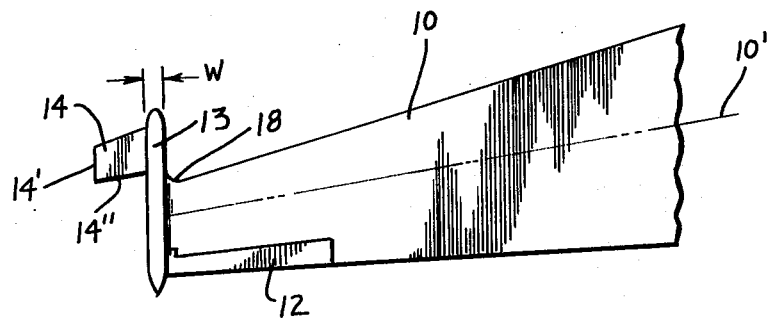
FIG. 2 is a plan view of one airplane wing of FIG. 1 showing generally the relative size of the attaching boom as well as the size and planform or shape of the wingtip control surface in relation to the aircraft wing and aileron.

Detailed Description and Structure of the Preferred Embodiment

Referring more particularly to the drawings, 10 designates a pair of fixed wings attached to the fuselage 11 of an airplane in the conventional manner. A standard aileron 12 is located along the trailing edge adjacent the outer end of each wing 10. An aerodynamic boom 13 is secured to the end of each wing 10 in any suitable manner such that it becomes, in effect, an integral part of the wing structure. A movable control surface 14 is attached by conventional means to the outboard side of each boom 13 proximate the forward end thereof. Each control surface 14 is connected to the airplane control system as for example by and through a fly-by-wire arrangement or by conventional mechanical linkages.

Figure 3:
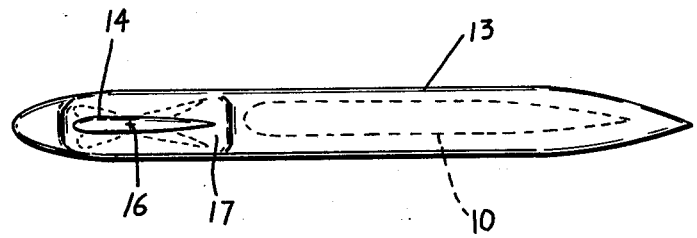
FIG. 3 is a side view of the boom and movable control surface primarily to illustrate the aerodynamic contours of the boom and the movable control cross-section, the boom height and the control surface movement as indicated in phantom lines.

With the movable control surfaces 14 undeflected solid lines in (FIG. 3) a basic wing load distribution results. This may be altered by upward deflection of the ailerons 12 whereby the bending moment along the wing is reduced. Also movement of the trailing edge of the wingtip control surfaces 14 alters the load distribution as well as reduces the bending moment at the wing root. The additional torsion resulting from aileron deflection is typically reduced by deflecting the movable control surfaces 14 in conjunction with the ailerons 12. The width W of each boom 13 is the minimum necessary to achieve adequate strength and to house an actuator such as an electro-hydraulic servo 15 used to deflect the associated movable control surface 14. The sweep of the leading edge of the control surface 14 is made compatible to i.e. substantially parallel to the sweep of the wing 10. The degree of the sweep of the wing 10 is, as customary, determined by the cruise speed of the airplane.

The fore and aft contours of each boom 13 are streamlined so that the air flow can proceed smoothly to the wing 10 and movable control surface 14. The cross-section of the movable control surface 14 is an airfoil shape of the type appropriate to the speed range of the airplane. The control surface 14 is pivoted medially as at 16 (about 40% aft of the leading edge thereof) so as to be capable of deflection both up and down for example 20° from the undeflected position. The location of the pivot 16 is dependent upon the airfoil contour, the control planform, the anticipated speed range of the airplane, and other dynamic considerations.

In the vicinity of the control surfaces 14, the side of each boom 13 is flat as at 17 and is of sufficient extent so that the portion of the control surface 14 next to each boom 13 remains relatively close to said side when the control surface 14 is deflected to its maximum angle i.e. 20° either up or down. Thus, the endplating effect provided by the flat sides 14 of the boom 13 ensures maximum effectivenss of the control surfaces 14.

The booms 13 are faired smoothly as at 18 into the wings 10 to ensure a smooth air flow near the junction. This also helps to reduce any drag due to interference between the components. The top and bottom contours of the booms 13 in the vicinity of the flat sides 17 are also streamlined so that the drag due to the boom 13 is minimized.

The exact location of the movable control surfaces 14 depends on the particular airplane. The net force produced by deflecting the control surfaces 14 lies ahead of the elastic axis 10' of the associated wing 10 while the net force produced by the ailerons lies behind the elastic axis 10' of the associated wing 10. The distance which each movable control surface 14 extends beyond the leading edge of the adjacent wing 10 is such that the forces combine to produce the most favorable torsion loading in the wing 10 from the standpoint of wing strength and service life. This distance will generally vary from about zero to about one wingtip chord length.

The planform size or area of such control surface 14 is determined from consideration of the amount of force one wishes to generate with its deflection, said force being to further reduce wing bending loads and improve the roll performance of the particular airplane. The overall size or area of the surface 14 is shown as about one-half of that of the associated aileron 12. The length of the outer tip 14' of the control surface 14 is approximately one-half to one times, illustrated as about three-fourths, the length of its root, while its span 14'' is approximately one-half to twice, shown as about equal to, the length of its root chord. The exact relationship between these geometric parameters will depend on the application and speed of the particular airplane.

Figure 4:
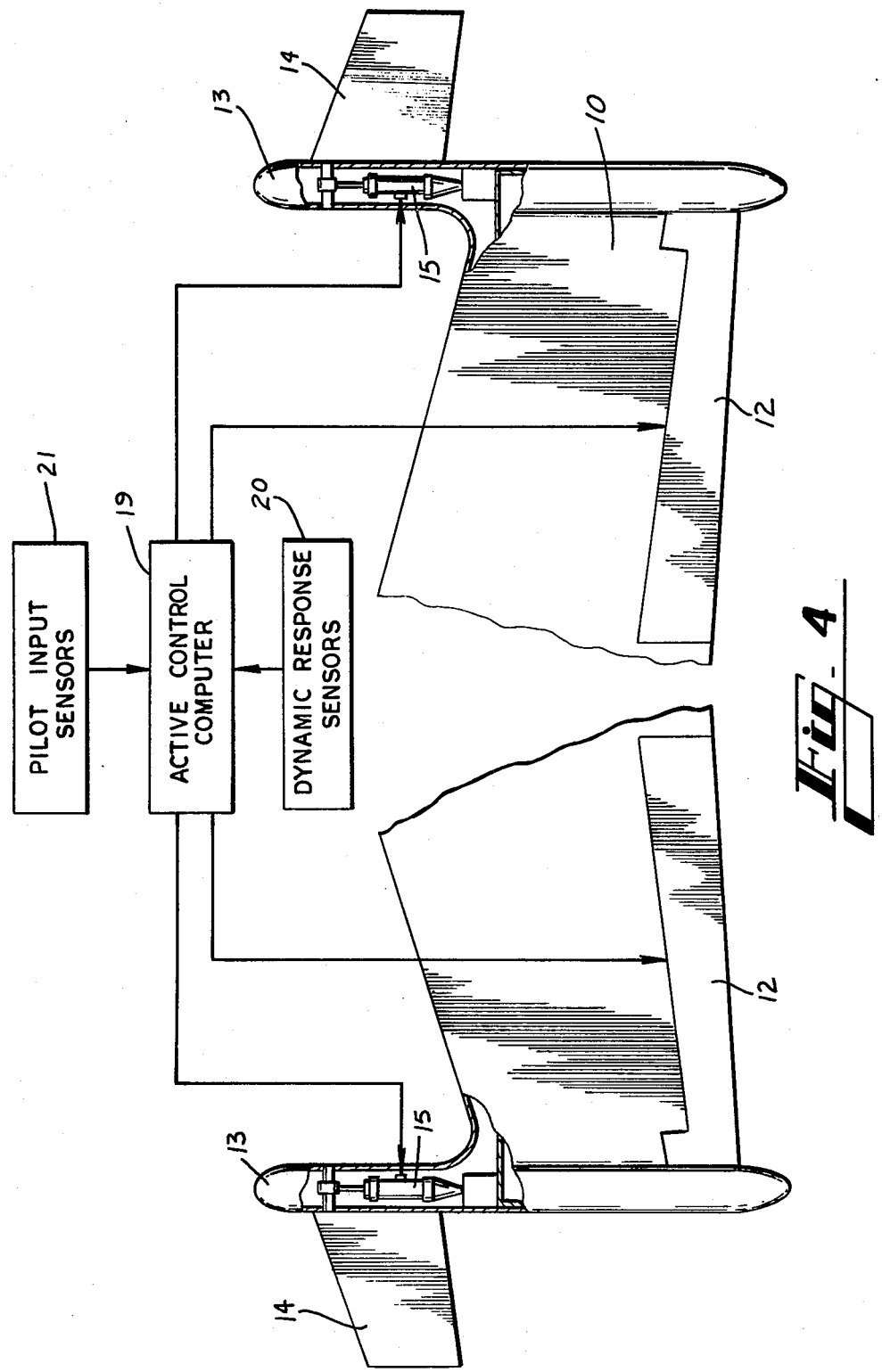
FIG. 4 is a schematic drawing to show how the wingtip control device is integrated into the airplane control system.

A method for actuation of the movable control surfaces 14 is shown in the block diagram of FIG. 4. The control surfaces 14 are moved, for example, by the electrohydraulic servos 15 energized by signals from a flight computer 19. Although the control surfaces 14 and ailerons 12 are capable of, and preferably, designed to move in conjunction with each other, the actuation systems are separate to ensure that one system is available to perform roll maneuvers in the event of failure of the other. In the event that potential high load flight conditions are encountered dynamic sensors 20 operatively connected to the flight computer 19 input to the computer 19 which in turns sends signals to the ailerons 12 and control surfaces 14 to deflect accordingly and thereby reduce wing loading. Separately the ailerons 12 and/or the control surfaces 14 are moved by signals from the computer 19 as effected by the pilot through input sensors 21 under his control.

While the invention has been herein above illustrated and described in what is believed to be its best and most practical form under present day conditions it is recognized that, under other conditions, this form would be modified. No attempt has been made to incorporate any of other such forms in this disclosure in the interest of clarity of the total inventive concept. The claims are relied upon to cover these other forms generally.

What is claimed is:

1. A flight control device for an airplane having a fuselage and fixed wings each including an associated aileron comprising:
   an aerodynamically configured boom attached to and extending along the outer tip of each said wing and terminating beyond the leading edge of said wing; a single movable aerodynamic surface of airfoil contour attached to each said boom adjacent the forward end thereof so as to be disposed ahead of the leading edge of the associated wing and lying in a plane substantially parallel to the plane of said wing; and a mechanism operatively connected to each said surface for the deflection thereof relative to the associated wing, such deflection being independent of but concurrent with and in the same direction as the associated aileron.

2. The device of claim 1, wherein each said boom has an outboard side extending at substantially right angles to and in the vicinity of said movable surface whereby the inboard end of said surface substantially abuts said side of said boom in all positions of its deflection.

3. The device of claim 1, wherein the upper and lower surfaces and the fore and aft ends of each said boom are aerodynamically contoured to ensure smooth air flow over said boom and the associated wing.

4. The device of claim 1 wherein said mechanism is located within each said boom.

5. The device of claim 4 wherein the maximum lateral dimension of each said boom is as small as possible.

6. A flight control device for an airplane having a fuselage and fixed wings each having an associated aileron comprising:
   an aerodynamically clean airfoil mounted medially of its chord to the tip of each said wing for movement through a deflection range of between about 10° and 30° up and down relative to the associated wing, each said airfoil being normally disposed with its chord line substantially in the plane of the wing chord and having a leading edge substantially parallel to the leading edge of the associated wing, each said airfoil being positioned ahead of the location of the elastic axis of said wing and having an outer tip length of about $\frac{1}{2}$ to 1 times the length of its root and a span of about $\frac{1}{2}$ to 2 times the length of its root chord; and
   a mechanism operatively connected to each said airfoil for the movement thereof as aforesaid, such movement being independent of but concurrent with and in the same direction as the associated aileron to reduce torsional loading of said wing and improve roll performance of said airplane.

7. The device of claim 6 wherein each said aileron is located at and along the trailing edge of the associated wing and wherein each said airfoil has a planform size of about $\frac{1}{4}$ to $\frac{3}{4}$ that of the associated aileron.

8. The device of claim 7 including a flight computer connected to said mechanism for the control thereof, said computer being responsive to signals from flight responsive sensors and pilot input sensors.

9. The device of claim 8 including connections between said computer and each said aileron.

10. The device of claim 6 wherein said wings are swept back.

* * * * *